United States Patent
Liu

(10) Patent No.: US 10,495,486 B2
(45) Date of Patent: Dec. 3, 2019

(54) INDUCTIVE TOUCH INPUT

(71) Applicant: TEXAS INSTRUMENTS INCORPORATED, Dallas, TX (US)

(72) Inventor: Dongtai Liu, Fremont, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/854,744

(22) Filed: Dec. 26, 2017

(65) Prior Publication Data

US 2018/0180450 A1 Jun. 28, 2018

Related U.S. Application Data

(60) Provisional application No. 62/439,113, filed on Dec. 26, 2016.

(51) Int. Cl.
| | |
|---|---|
| *G01D 5/20* | (2006.01) |
| *G06F 3/0485* | (2013.01) |
| *G06F 3/041* | (2006.01) |
| *G06F 1/16* | (2006.01) |
| *G06F 3/046* | (2006.01) |
| *G06F 3/0354* | (2013.01) |

(52) U.S. Cl.
CPC .............. *G01D 5/20* (2013.01); *G06F 1/169* (2013.01); *G06F 1/1626* (2013.01); *G06F 1/1671* (2013.01); *G06F 3/03547* (2013.01); *G06F 3/041* (2013.01); *G06F 3/046* (2013.01); *G06F 3/0485* (2013.01); *G06F 2203/0339* (2013.01)

(58) Field of Classification Search
CPC ........... G01D 5/20; G06F 1/169; G06F 3/041; G06F 3/046; G06F 3/0485
See application file for complete search history.

(56) References Cited

U.S. PATENT DOCUMENTS

| | | | |
|---|---|---|---|
| 2009/0189749 A1* | 7/2009 | Salada ................ | G06F 1/1616 340/407.2 |
| 2011/0187204 A1* | 8/2011 | Lacey ................ | H03K 17/96 307/139 |
| 2017/0090654 A1* | 3/2017 | Silvanto ................ | G06F 3/0238 |
| 2018/0074636 A1* | 3/2018 | Lee ................ | G06F 3/0414 |
| 2018/0173028 A1* | 6/2018 | Koppal ................ | G02F 1/1309 |

* cited by examiner

*Primary Examiner* — Nelson M Rosario
(74) *Attorney, Agent, or Firm* — Andrew Viger; Charles A. Brill; Frank D. Cimino

(57) ABSTRACT

A touch-scroll apparatus can provide touch-scroll input/functionality, such as for a mobile communication device (as an example application). The touch-scroll apparatus includes a multi-coil sensor assembly including multiple sense inductor coils (for example, three). A sensor slot is formed in a portion of the device case (such as a device side-wall), defining a touch-scrolling surface/area at the exterior of the device. The sidewall slot is dimensioned to receive and position the touch-scrolling multi-coil sensor assembly relative to the touch-scrolling surface/area. Inductive sensor electronics is coupled to the multiple touch-scroll sense inductor coils to detect scrolling movement and direction based on signal output from the sensor inductor coil signals (such as changes in coil inductance), including for each a peak signal corresponding to maximum deflection of the touch-scrolling surface/area opposite the sense inductor coil. The touch-scrolling sensor assembly can be secured within the sensor slot with elastomeric pads.

17 Claims, 3 Drawing Sheets

INDUCTIVE TOUCH INPUT

CROSS-REFERENCE TO RELATED APPLICATIONS

Priority is claimed under 37 CFR 1.78 and 35 USC 119(e) to U.S. Provisional Application 62/439,113, filed 2016 Dec. 26, which is incorporated in its entirety by reference.

BACKGROUND

Technical Field

This Patent Disclosure relates to touch input, such as for use in mobile/personal communications/computing devices.

Related Art

In mobile devices (and other equipment), touch sensing technology can be used to replace physical/mechanical buttons. Touch sensing, which can be based on capacitive and inductive sensing, can be used to detect touch deflection/deformation of a touch button defined on a touch surface.

In the case of inductive touch sensing, a sense coil (inductor) is driven to project a time-varying magnetic sensing field within a defined sensing area that can encompass a touch surface area spaced from the sensor. The magnetic sensing field induces eddy current loops in the proximate touch area, resulting in an eddy-current back emf (electromotive force) voltage opposing the sensor-projected sensing field, and eddy-current energy losses (resistive) in the touch area.

Eddy current sensing can be based on changes in mutual inductance between the sense coil and the induced eddy current loops resulting from the back emf/voltage induced in the sense coil inductor, and/or changes in sensor impedance resulting from the resistive energy loss in the touch-area eddy current loops. Changes in mutual inductance can be measured/detected based on, for example, changes in sensor inductance, or changes in a sensor property corresponding to inductance. Changes in sensor impedance reflecting resistive energy loss can be measured/detected based on, for example, changes in the signals that drive the sensor to project the sensing field.

BRIEF SUMMARY

This Brief Summary is provided as a general introduction to the Disclosure provided by the Detailed Description and Drawings, summarizing aspects and features of the Disclosure. It is not a complete overview of the Disclosure, and should not be interpreted as identifying key elements or features of, or otherwise characterizing or delimiting the scope of, the disclosed invention.

The Disclosure describes inductive touch-scrolling apparatus and methods using multiple sense (inductor) coils, for detecting scroll movement direction/rate based on signal peaking according to this Disclosure, such as can be used in an example mobile communications device.

According to aspects of the Disclosure, a touch scrolling apparatus for a device, can include a multi-coil sensor assembly including multiple sense inductor coils. A sensor slot formed in a portion of the device case, defines a touch-scrolling surface/area at the exterior of the device, the sensor slot dimensioned to receive and position the multi-coil sensor assembly relative to the touch-scrolling surface/area. Sensor electronics coupled to the multiple sense inductor coils to detect scrolling movement and direction based on signal output from the sensor inductor coils, including for each a peak signal corresponding to maximum deflection of the touch-scrolling surface/area opposite the sense inductor coil.

Other aspects and features of the invention claimed in this Patent Document will be apparent to those skilled in the art from the following Disclosure.

BRIEF DESCRIPTION OF THE DRAWINGS

FIG. 4 illustrate example inductance plots for each of three example sense coils [inductance outputs 421, 422, 423], with signal (inductance) peaking for respective scroll positions adjacent one of the sense coils; and FIG. 5 illustrates an example peaking plot for the example touch-scroll methodology, illustrating peaking signal direction and rate for an example scrolling from sense coil 1→2→3 [peaking plots 521, 522, 523].

DETAILED DESCRIPTION

This Description and the Drawings constitute a Disclosure for an inductive touch-scrolling apparatus and methodology for detecting touch scroll direction/rate based on signal peaking, including describing design examples (example implementations), and illustrating various technical features and advantages.

In brief overview, in example embodiments, a touch-scroll apparatus can provide touch-scroll input/functionality, such as for a mobile communication device (as an example application). The touch-scroll apparatus includes a multi-coil sensor assembly including multiple sense inductor coils (for example, three). A sensor slot is formed in a portion of the device case (such as a device side-wall), defining a touch-scrolling surface/area at the exterior of the device. The sidewall slot is dimensioned to receive and position the touch-scrolling multi-coil sensor assembly relative to the touch-scrolling surface/area. Inductive sensor electronics is coupled to the multiple touch-scroll sense inductor coils to detect scrolling movement and direction based on signal output from the sensor inductor coil signals (such as changes in coil inductance), including for each a peak signal corresponding to maximum deflection of the touch-scrolling surface/area opposite the sense inductor coil. The touch-scrolling sensor assembly can be secured within the sensor slot with elastomeric pads.

Figure 1:
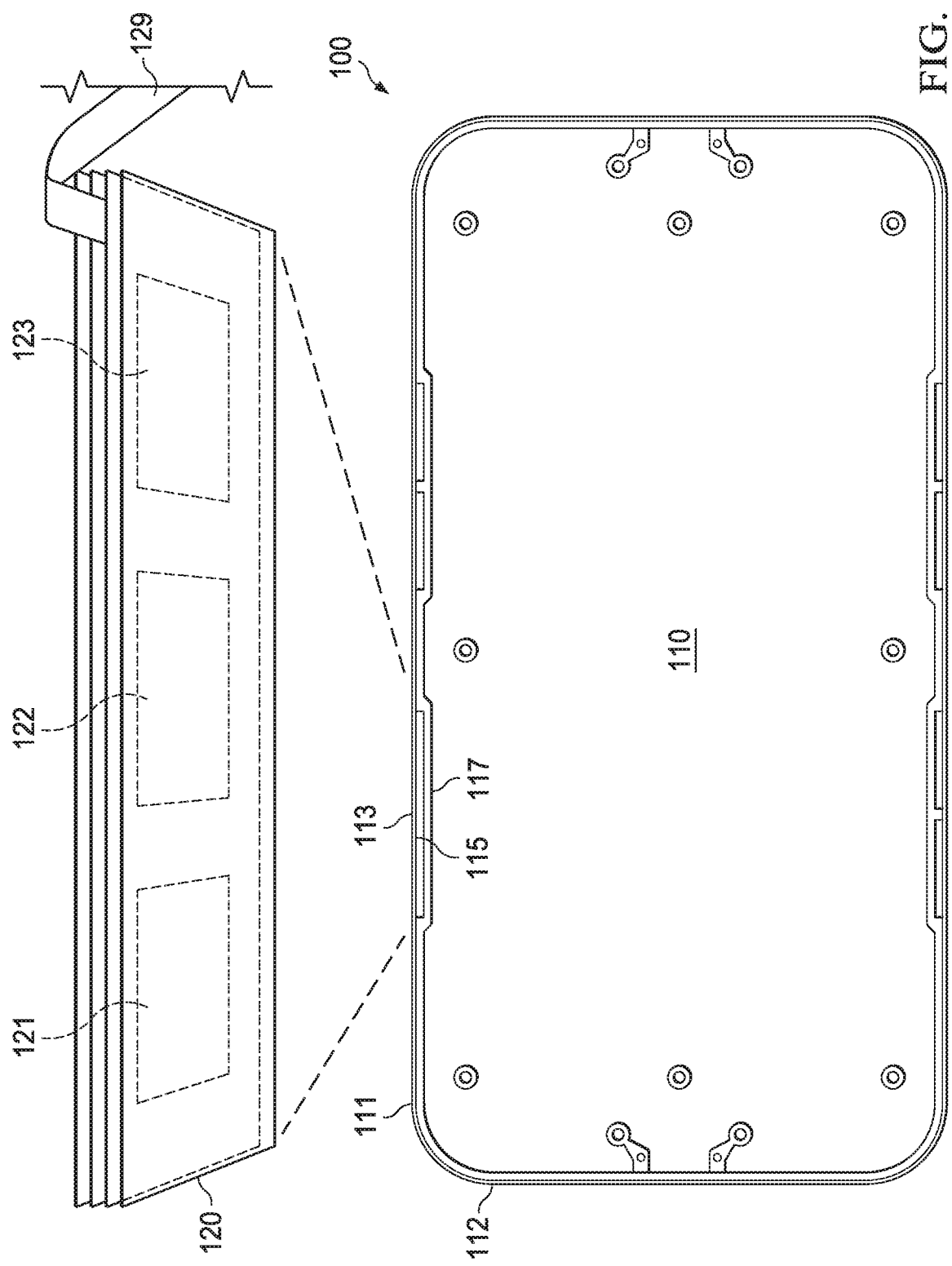
FIG. 1 illustrates an example inductive touch-scroll apparatus using multiple sense (inductor) coils [for example, three 121/122/123], for detecting touch-scroll movement/direction/rate based on signal peaking according to this Disclosure, implemented in an example mobile communications device [100/110], including a touch-scroll sidewall surface/area [113] and back-side sidewall slot [115], dimensioned to retain a sensor (coil) assembly [120], adjoining the touch-scroll surface/area.

FIG. 1 illustrates an example inductive touch-scroll apparatus using multiple sense (inductor) coils for detecting touch-scroll movement/direction/rate based on signal peaking according to this Disclosure. The example inductive touch-scroll apparatus is implemented in an example mobile communications device 100 that includes a case 110, with sidewalls 111 and 112.

A touch-scroll side-wall surface/area 113 is defined on sidewall 111. The touch-scroll apparatus includes a back-side sidewall slot 115 defined by an interior slot-wall 117, and dimensioned to retain a sensor (coil) assembly 120, adjoining the touch-scroll surface/area 113.

The example sensor coil assembly 120 is configured to include multiple sense (inductor) coils, in this example three 121/122/123. Sensor coil assembly 120 can be implemented as a flexible printed circuit board with printed sense coils 121/122/123 coupled to a trace interconnect 129 for coupling to sensor electronics (as described in connection with FIG. 3).

Figure 2:
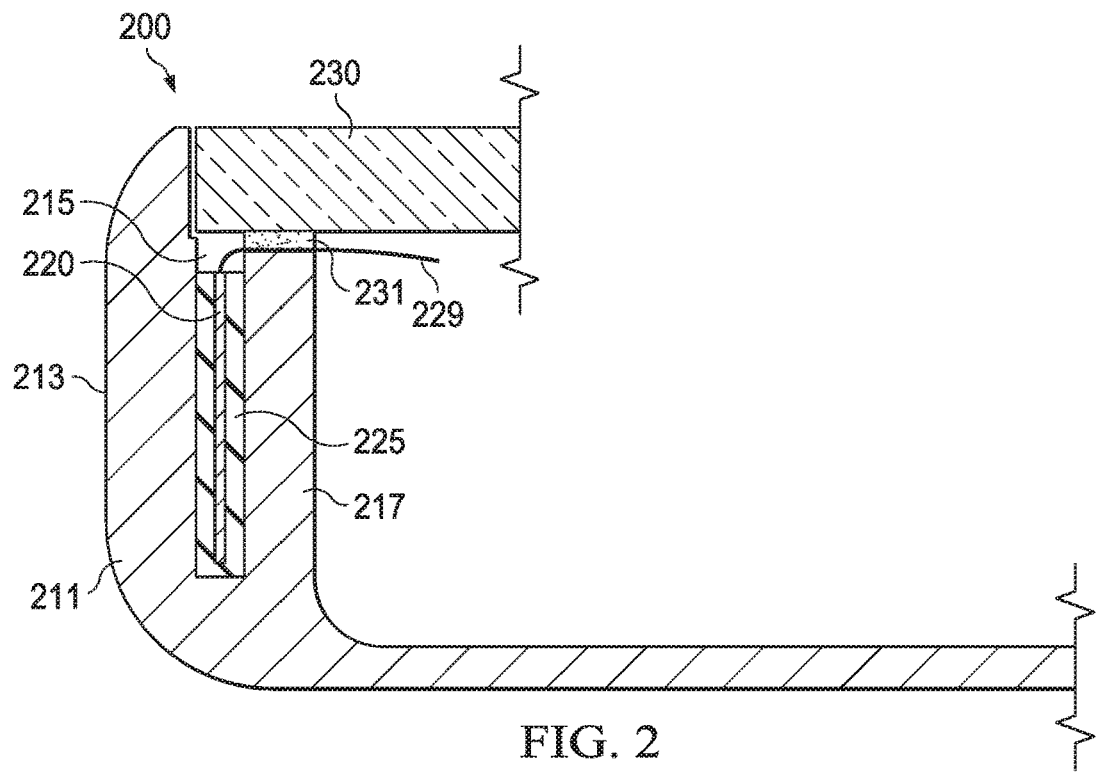
FIG. 2 illustrates detail for the example inductive touch-scroll apparatus of FIG. 1, including a touch-scroll sidewall surface area [213] with an adjoining back-side sidewall slot [215], for retaining a sensor coil assembly [220] retained within the side-wall slot, and spaced from the touch-scroll side-wall surface/area, by flexible elastomeric pads [225].

FIG. 2 illustrates detail for the example inductive touch-scroll apparatus of FIG. 1. An example mobile device case 200 includes sidewall 211 on which is defined a touch-scroll sidewall surface/area 213. Adjoining the touch-scroll sidewall surface area 213] is a back-side sidewall slot 215 defined by slot-wall 217. The sidewall slot 215 is dimensioned for insertion and retention of a sensor coil assembly 220 (including interconnect 229).

Figure 3:
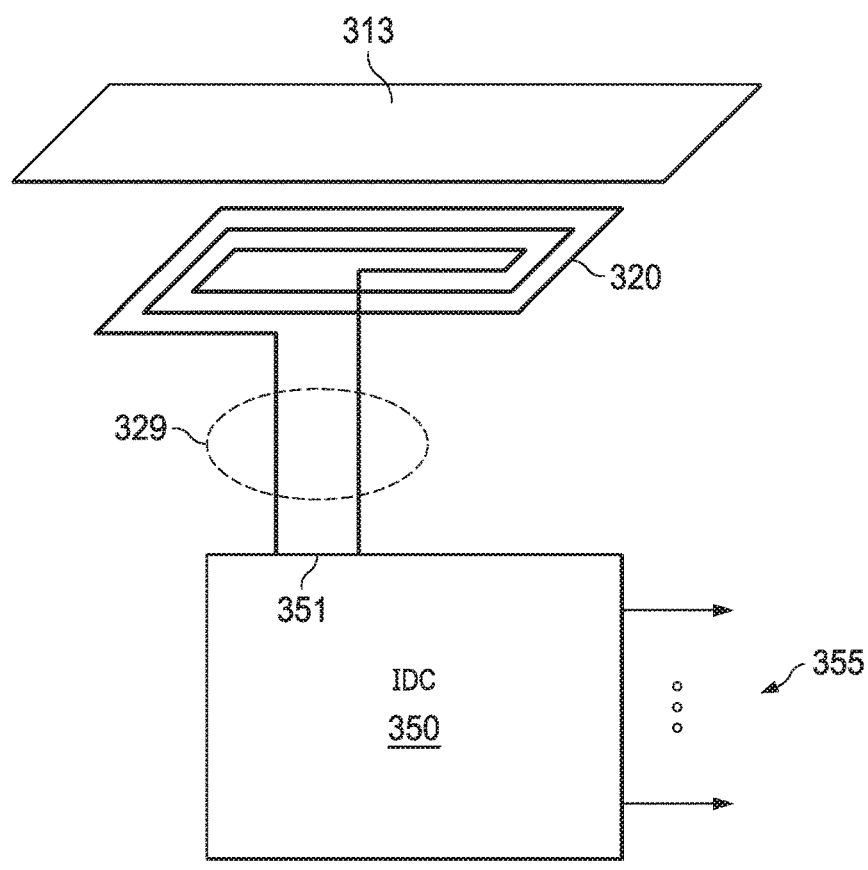
FIG. 3 illustrates an example interconnect of a sensor coil assembly, functionally represented by a single sense coil [320], with interconnect [329] to example sensor electronics functionally represented by an inductance-to-data converter (IDC) [350].

Sensor coil assembly can be retained within the sidewall slot 215 by any structure/material that maintains a spacing (sensing gap) between the sensor coil assembly 220 (FIG. 1A, sense coils 121/122/123) and the touch-scroll surface/area 213, while permitting deflection of the touch-scroll surface/area toward the sense coil assembly 220 based on touch-scrolling, reducing the distance between the conductive touch surface/area 213 and the sense inductor coils. For the example implementation, sense coil assembly 220 is retained within sidewall slot 215, and spaced from the touch-scroll side-wall surface/area, by flexible elastomeric material/pads 225. That is, insertion can be accomplished by compressing the elastomeric pads and inserting the sensor assembly (such as a printed circuit board) into the Side-Wall Sensor Slot, with the elastomeric pads decompressing to secure the Multi-Coil Sensor Assembly within the Sensor Slot FIG. 3 illustrates an example interconnect of a sensor coil assembly and sensor electronics. A sensor coil assembly is functionally represented by a single sense coil 320 adjoining a touch-scroll surface/area represented by 313. Sensor coil assembly 320 is coupled through an interconnect (trace) 329 (in FIG. 1, 129, and in FIG. 2, 229) to example sensor electronics, functionally represented by an inductance-to-data converter (IDC) 350.

IDC 350 includes an input port/terminal to couple to the interconnect 329 for the sensor coil assembly 320. IDC 350 can be configured to drive the sense inductor coils to project a magnetic sensing field (in the direction of the touch-scroll surface/area 313, and to detect/measure sensor response to a deflection/deformation of the touch-scroll surface/area cause by touch-scrolling. IDC 350 can be configured to convert sensor response to corresponding data from which touch-scrolling movement/direction/rate can be determined based on the touch-scrolling signal peaking methodology according to the Disclosure. For example, IDC 350 can be configured to provide sensor response data for each of the multiple sense inductor coils of the touch-sensor assembly 320, for processing according to the touch-scrolling signal peaking methodology of this Disclosure.

Touch-scrolling detection and processing is based on inductive sensing with multiple-sensor inductor coils, and associated sensor electronics. Implementations of inductive sensing technology are not part of this Disclosure, and are not described in detail. For example, inductive sensing can be based on detecting touch-press deformation of a touch scrolling surface (adjacent the sidewall sensor slot that includes the multi-coil sensor assembly), configured as a conductive target, toward the spaced sensor inductor coils, causing a change in coil inductance (i.e., a change in the projected magnetic field of the coil inductor driven by the sensor electronics).

For an example inductive sensing implementation, the sensor electronics can be designed to provide excitation current drive to the multiple sensor inductor coils (creating a projected time varying magnetic sensing field), and to measure a sensor inductor coil characteristic (such as inductance or Q-factor) indicative of the scrolling position on the touch-scrolling sensor track relative to the sensor inductor coil, including deflection of the touch scrolling surface toward the sense inductor coil in response to touch-scrolling.

Figure 4:
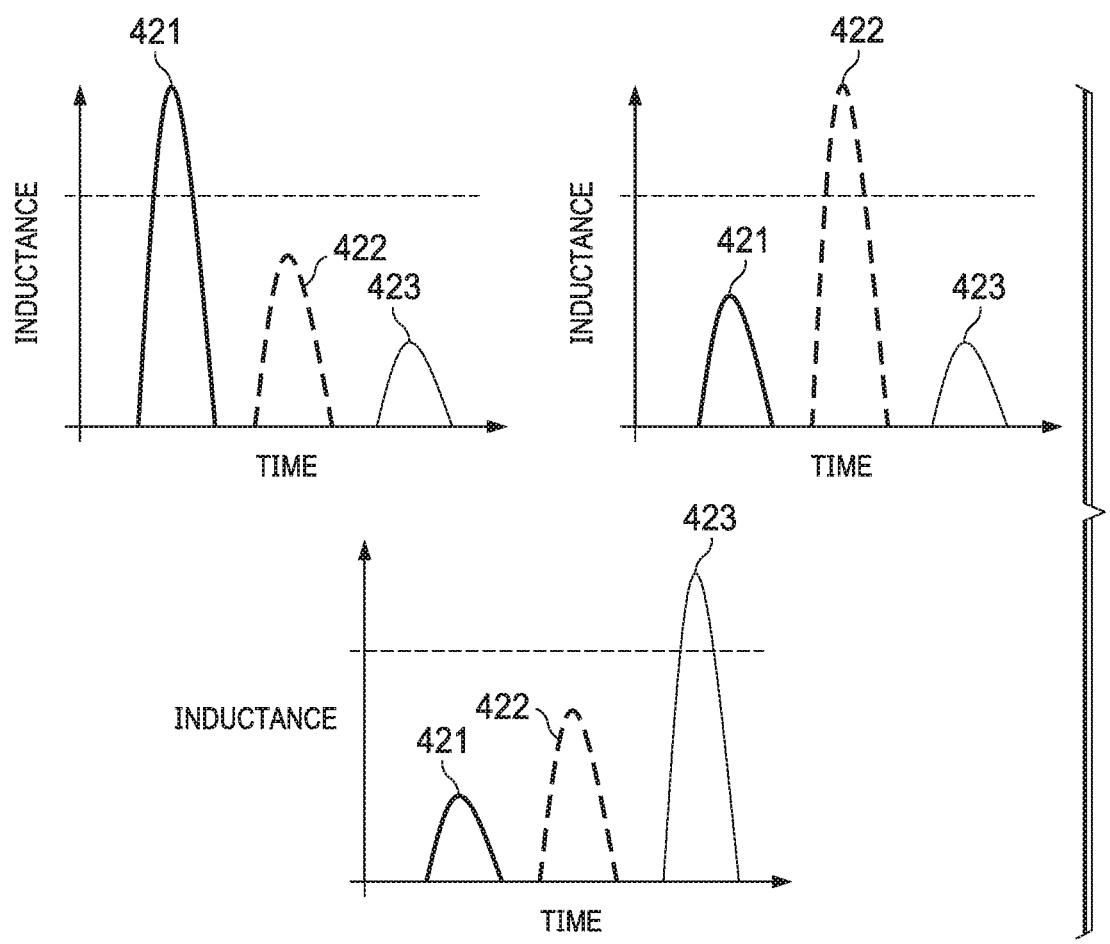
FIGS. 4 and 5 illustrate an example touch-scroll methodology for detecting touch-scroll movement/direction/rate based on signal peaking according to this Disclosure, which can be implemented for the example inductive touch-scroll apparatus of FIGS. 1/2/3.
Figure 5:
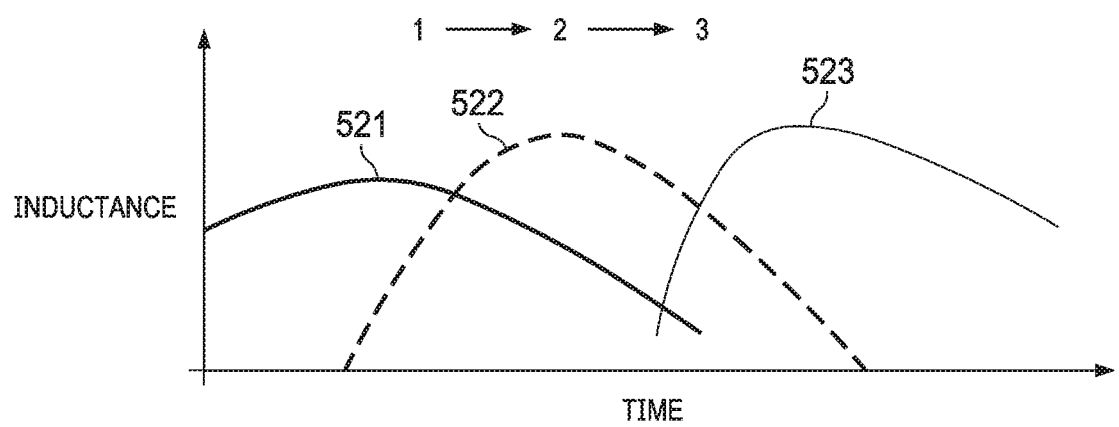

FIGS. 4 and 5 illustrate an example touch-scroll methodology for detecting touch-scroll movement/direction/rate based on signal peaking according to this Disclosure, which can be implemented for the example inductive touch-scroll apparatus of FIGS. 1/2/3.

FIG. 4 illustrate example inductance plots for each of three example sense coils, such as sense coils 121, 122, 123 of FIG. 11. Touch-scrolling causes a deflection/deformation detected as a sense inductor coil response. At each position along a scrolling track defined by a touch-scroll surface/area (such as FIG. 1, 113), as response of the sense inductor coil with the maximum deflection will peak, as illustrated by the inductance plots 421, 422, 423, representing the sensor response for respective sense inductor coils. For example, in the case of scrolling from left to right in FIG. 4, first the response of sense coil 1 will peak, followed by the response of sense coil 2 and sense coil three. For a touch-scroll position directly opposite as sense coil, that sense coil will response (inductance) will peak (indicating maximum deflection/deformation of the touch-scroll surface/area), with the sensor responses from the other sense coils at a lesser (albeit non-zero) magnitude. Thus, at each scroll position relative to a sense coil, the inductance outputs 421, 422, 423 will exhibit corresponding signal-magnitude (inductance) peaking.

That is, pressing at different location along the slot invokes inductance changes in the coils. The pattern of the change is used to derive the finger movement FIG. 5 illustrates an example peaking plot for the example touch-scroll methodology, illustrating peaking signal detection for scroll direction and rate for an example scrolling along the touch-scroll track defined by touch-scroll surface/area (such as FIG. 1, 113), from sense coil 1→2→3. That is, peak signal output progresses from the upper sensor inductor coil, to the middle sensor inductor coil to the lower sensor inductor coil, in the direction of scrolling.

Example corresponding peaking plots are illustrated as inductance plots 521, 522, 523]. From these peaking plots of inductance vs. time, captured as sensor response data by the sensor electronics (such as the example IDC of FIG. 3) that correlates to scrolling movement/direction/rate, according to the methodology of the Disclosure.

The Disclosure provided by this Description and the Figures sets forth example designs and applications illustrating aspects and features of the inductive touch-scrolling apparatus and methodology for detecting touch scroll direction/rate based on signal peaking, and does not limit the scope of the invention defined by the claims. Known circuits, connections, functions and operations are not described in detail to avoid obscuring the principles and features of the Disclosed example designs and applications. This Disclosure can be used by ordinarily skilled artisans as a basis for modifications, substitutions and alternatives, including adaptations for other applications.

The invention claimed is:

1. A touch scrolling apparatus for a device, comprising:
a multi-coil sensor assembly including multiple adjacent sense inductor coils;
a sensor slot formed in a portion of the device case, defining a touch-scrolling surface/area at the exterior of the device;
the sensor slot dimensioned to receive and position the multi-coil sensor assembly relative to the touch-scrolling surface/area;
each sensor inductor coil configured to provide a peak signal corresponding to maximum deflection of the touch-scrolling surface/area opposite the sense inductor coil
the multiple adjacent sense inductor coils arranged such that a scrolling movement along the touch-scrolling surface/area from one sense inductor coil to another sense inductor coil results in a peaking signals that progress with the scrolling movement;
sensor electronics coupled to the multiple sense inductor coils to detect scrolling movement and direction based on the peaking signals output from the sensor inductor coils.

2. The apparatus of claim 1, wherein the device is a mobile communication device.

3. The apparatus of claim 2, wherein the sensor slot is formed in a side-wall of the device.

4. The apparatus of claim 1, wherein the multi-coil sensor assembly is secured within the sensor slot with elastomeric pads.

5. The apparatus of claim 1, wherein the sensor electronics is operable to detect sense inductor coil inductance, including changes in inductance based on touch-scrolling deflection of the touch-scrolling surface in the direction of the sense inductor coil.

6. The apparatus of claim 1 wherein the multi-coil sensor assembly includes three adjacent sense inductor coils.

7. A circuit for use in a touch scrolling apparatus for a device, the device including a multi-coil sensor assembly including multiple adjacent sense inductor coils, and a sensor slot formed in a portion of the device case defining a touch-scrolling surface/area at the exterior of the device, where each sense inductor coil is configured to provide a peak signal corresponding to maximum deflection of the touch-scrolling surface/area opposite the sense inductor coil, and where the multiple adjacent sense inductor coils are arranged such that a scrolling movement along the touch-scrolling surface/area from one sense inductor coil to another sense inductor coil results in a peaking signals that progress with the scrolling movement; the circuit comprising:

an input/output port configured to couple to the multi-coil sensor assembly, and to receive in response to a scrolling movement along the touch-scrolling surface/area, the peaking signals;
an inductance-to-data converter (IDC) coupled to input/output port, operable
to detect sensor inductor coil inductance, including changes in inductance based on touch-scrolling deflection of the touch-scrolling surface in the direction of the sense inductor coil; and
to detect scrolling movement and direction based on peaking signals received through the input/output port.

8. The circuit of claim 7, wherein the device is a mobile communication device.

9. The circuit of claim 8, wherein the sensor slot is formed in a side-wall of the device.

10. The circuit of claim 7, wherein the multi-coil sensor assembly is secured within the sensor slot with elastomeric pads.

11. The circuit of Claim, wherein the multi-coil sensor assembly includes three adjacent sense inductor coils.

12. A method of providing touch scrolling for a device, comprising:
configuring the device with a touch-scrolling surface/area that includes:
a multi-coil sensor assembly including multiple adjacent sense inductor coils;
a sensor slot formed in a portion of the device case, defining a touch-scrolling surface/area at the exterior of the device;
the sensor slot dimensioned to receive and position the multi-coil sensor assembly relative to the touch-scrolling surface/area;
configuring each sensor inductor coil to provide a peak signal corresponding to maximum deflection of the touch-scrolling surface/area opposite the sense inductor coil;
arranging the multiple adjacent sense inductor coils such that a scrolling movement along the touch-scrolling surface/area from one sense inductor coil to another sense inductor coil results in a peaking signals that progress with the scrolling movement;
detecting scrolling movement and direction based on the peaking signals output from the sensor inductor coils.

13. The method of claim 12, wherein the device is a mobile communication device.

14. The method of claim 13, wherein the sensor slot is formed in a side-wall of the device.

15. The method of claim 12, wherein the multi-coil sensor assembly is secured within the sensor slot with elastomeric pads.

16. The method of claim 12, wherein detecting scrolling movement comprises detecting sense inductor coil inductance, including changes in inductance based on touch-scrolling deflection of the touch-scrolling surface in the direction of the sense inductor coil.

17. The method of claim 12 wherein the multi-coil sensor assembly includes three adjacent sense inductor coils.

* * * * *